(12) United States Patent
Bae et al.

(10) Patent No.: US 7,424,568 B2
(45) Date of Patent: Sep. 9, 2008

(54) METHOD FOR BROADCASTING DATA PACKET AND RECEIVING THE DATA PACKET IN WIRELESS UNIVERSAL SERIAL BUS (USB) ENVIRONMENT, WIRELESS USB HOST, AND WIRELESS USB DEVICE

(75) Inventors: Dae-gyu Bae, Suwon-si (KR); Jin-woo Hong, Suwon-si (KR); Hyun-ah Sung, Seoul (KR); Se-Hoon Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 11/481,014

(22) Filed: Jul. 6, 2006

(65) Prior Publication Data
US 2007/0061436 A1 Mar. 15, 2007

(30) Foreign Application Priority Data
Aug. 23, 2005 (KR) ........................ 10-2005-0077373

(51) Int. Cl.
*G06F 13/20* (2006.01)
*G06F 13/00* (2006.01)

(52) U.S. Cl. ........................ 710/313; 710/316; 710/8; 709/238; 370/464

(58) Field of Classification Search .............. 710/8–12, 710/36–42, 305–316; 709/230, 238–240; 370/464
See application file for complete search history.

(56) References Cited

U.S. PATENT DOCUMENTS

| 6,633,583 | B1 | 10/2003 | Esterson | |
|---|---|---|---|---|
| 2004/0225818 | A1 | 11/2004 | Han | |
| 2004/0246909 | A1* | 12/2004 | Ahn | 370/252 |
| 2004/0258006 | A1* | 12/2004 | An | 370/310 |
| 2005/0013267 | A1 | 1/2005 | An | |
| 2006/0092899 | A1 | 5/2006 | Hong et al. | |
| 2007/0073935 | A1* | 3/2007 | Kim et al. | 710/62 |
| 2007/0294456 | A1* | 12/2007 | Chan et al. | 710/313 |
| 2008/0008154 | A1* | 1/2008 | Mizukoshi | 370/347 |

FOREIGN PATENT DOCUMENTS

| EP | 1 686 744 A1 | 8/2006 |
|---|---|---|
| JP | 2001-156797 A | 6/2001 |
| KR | 10-1999-023310 A | 3/1999 |

* cited by examiner

Primary Examiner—Christopher B. Shin
(74) Attorney, Agent, or Firm—Sughrue Mion, PLLC

(57) ABSTRACT

A method for broadcasting a data packet in a wireless universal serial bus (USB) environment, a method for receiving the data packet being broadcasted, a wireless USB host, and a wireless USB device are provided. The method for broadcasting a data packet in a wireless USB environment includes generating a management packet containing broadcast Channel Time Allocation (CTA) information, transmitting the management packet to at least one USB device within a cluster of USB devices, and broadcasting a data packet during a time indicated by the broadcast CTA information.

19 Claims, 12 Drawing Sheets

METHOD FOR BROADCASTING DATA PACKET AND RECEIVING THE DATA PACKET IN WIRELESS UNIVERSAL SERIAL BUS (USB) ENVIRONMENT, WIRELESS USB HOST, AND WIRELESS USB DEVICE

This application claims priority from Korean Patent Application No. 10-2005-0077373 filed on Aug. 23, 2005 in the Korean Intellectual Property Office, the disclosure of which is incorporated herein by reference in its entirety.

BACKGROUND OF THE INVENTION

1. Field of the Invention

The present invention relates to wireless Universal Serial Bus (USB), and more particularly, to a method for broadcasting a data packet and receiving the data packet in a wireless USB environment, a wireless USB host, and a wireless USB device.

2. Description of the Related Art

With the development of communication and network technologies, the network environment has recently been evolving from a wired network environment using a cable medium such as a coaxial cable or an optical cable into a wireless network environment using radio signals in various frequency bands.

Wireless networks are classified into two types—an infrastructure mode network and an ad-hoc mode network as shown in FIGS. 1 and 2.

Furthermore, ad-hoc mode wireless networks can be classified into two types based on the presence of a coordinator. In one type of network, a randomly selected wireless device acts as a coordinator that assigns channel time to other wireless devices within the same wireless network for data transmission and the other wireless devices are allowed to transmit data only at the assigned time.

The other type of network allows all network devices to coordinate channel access for transmission of data packet at any time desired without using a coordinator.

A wireless interface for connecting network devices in a wireless manner is needed to perform communication in a wireless network environment. Infrared Data Association (IrDA) and Bluetooth can be used as a wireless interface. Research into wireless USB for making conventional wired USB wireless is now being conducted.

USB provides data transfer rates of up to 12 Mbps while other serial ports support speeds of up to 100 Kbps. The use of USB as an interface between network devices eliminates the need to install complicated adapters. The use of USB also eliminates the need to separately set up software or hardware when peripheral devices are connected to a personal computer (PC). USB connects all kinds of peripheral devices to a PC through the same connector, thus significantly reducing the number of ports. USB also is easy to install and allows miniaturization of a portable PC.

USB is designed to basically support one-to-one communication between a host and a device. However, for wireless USB using a wireless medium in which a data transmission path is not fixed, a technique that allows a host to broadcast a data packet to a number of devices in a wireless USB environment as well as one-to-one communication between the host and a device is required. Recently, USB has been widely used for connection between independent devices such as camcorders and digital cameras and a PC as well as connection between peripheral devices and a PC. Thus, there is an increasing need for a technique for broadcasting a data packet in a wireless USB environment.

Korean Laid-open Publication No. 10-1999-23310, entitled "Wireless Device and Method for Establishing Connection between Wireless Devices", proposes a technique for implementing wireless USB. However, the proposed method necessitates the installation of a separate wireless hub and ports unlike wireless USB technology. Furthermore, because the method disclosed in the above-cited reference uses conventional USB technology and intends to implement wireless USB by converting a USB signal into a wireless signal, it is difficult to broadcast a data packet using the method.

SUMMARY OF THE INVENTION

The present invention provides a method for broadcasting a data packet and receiving the broadcasted data packet in a wireless USB environment.

According to an aspect of the present invention, there is provided a method for broadcasting a data packet in a wireless USB environment including generating a management packet containing broadcast Channel Time Allocation (CTA) information, transmitting the management packet to at least one USB device within a single cluster, and broadcasting a data packet during a time period indicated by the broadcast CTA information.

According to another aspect of the present invention, there is provided a method for receiving a data packet being broadcasted in a wireless USB environment receiving a data packet being broadcasted in a wireless USB environment, the method including receiving a management packet from a wireless USB host, extracting broadcast CTA information from the received management packet, and receiving a data packet being broadcasted by the wireless USB host during a time indicated by the extracted broadcast CTA information.

According to still another aspect of the present invention, there is provided a wireless USB host including a management packet generator which generates a management packet containing broadcast CTA information, a data packet generator which generates a data packet to be broadcasted, a transmitter sends the management packet to a wireless USB device within a single cluster and broadcasts the data packet during a time indicated by the broadcast CTA information.

According to a further aspect of the present invention, there is provided a wireless USB device including a receiver which receives a management packet and a data packet from a wireless USB host, a management packet processor extracts broadcast CTA information from the received management packet, and a data packet processor which delivers a data packet received during a time indicated by the extracted broadcast CTA to an endpoint responsible for reception of data being broadcasted.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Figure 1:
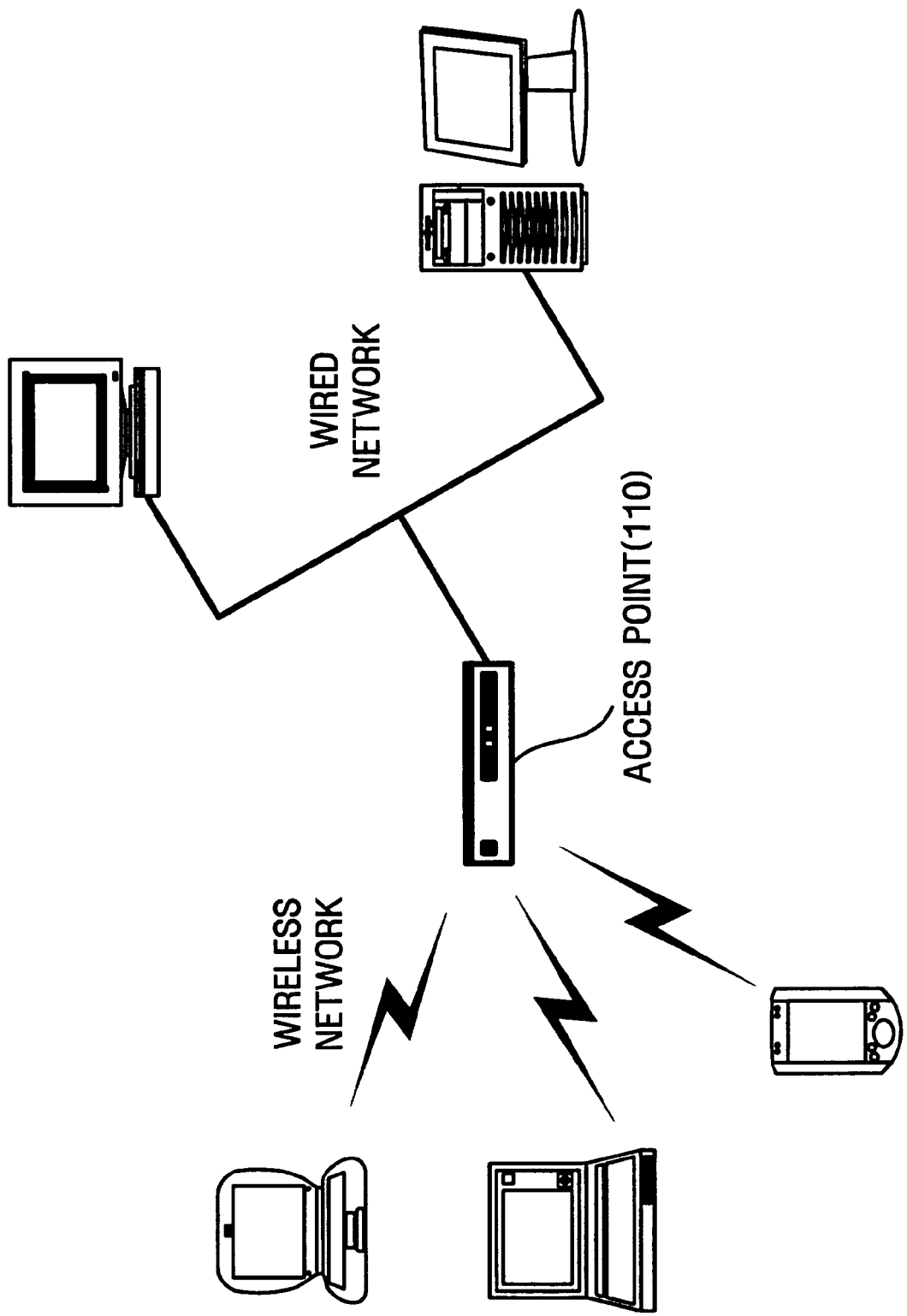
FIG. 1 illustrates an infrastructure mode wireless network.
Figure 2:
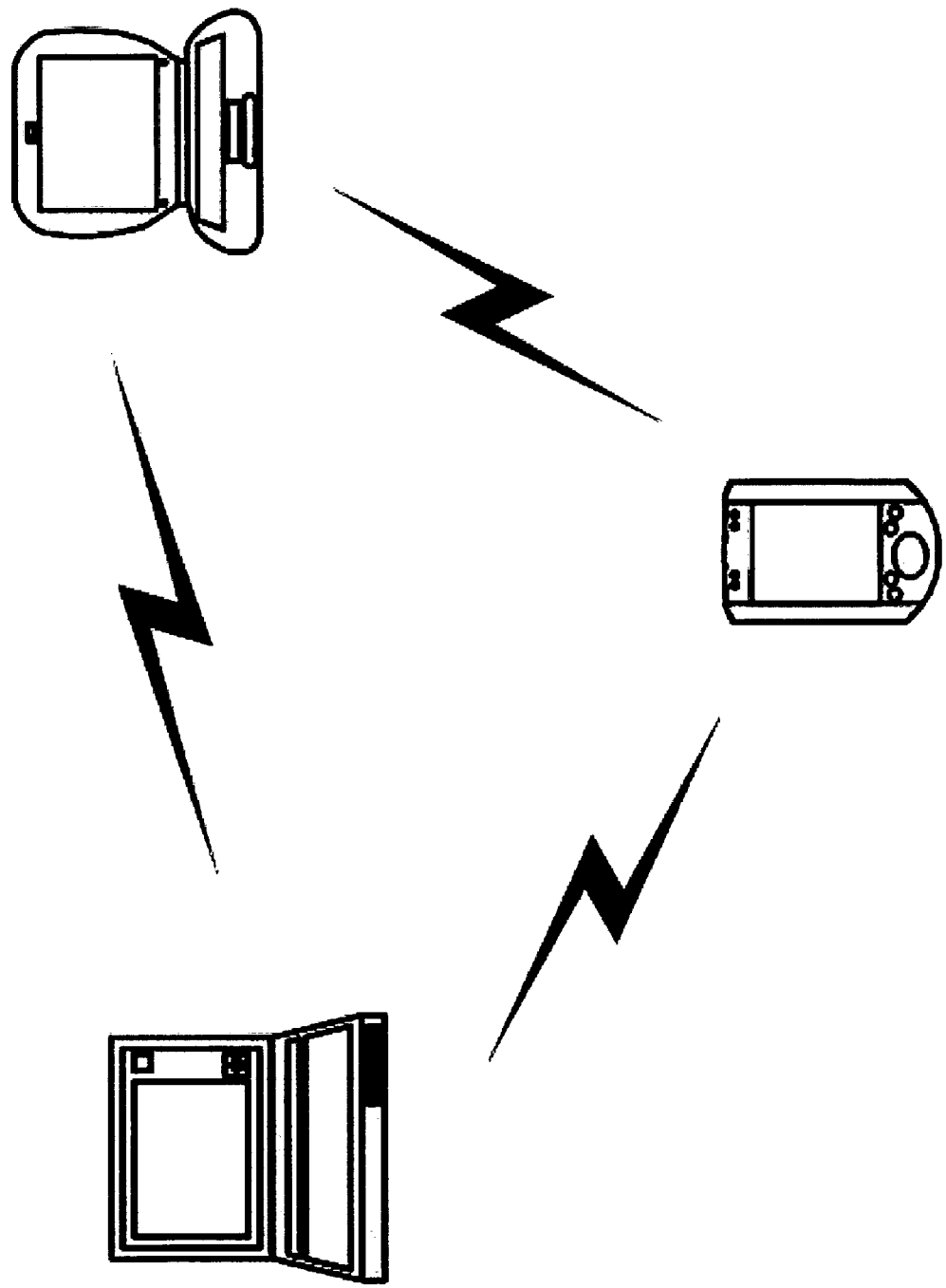
FIG. 2 illustrates an ad hoc mode wireless network.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will be described exemplary embodiments of the invention hereinafter with reference to flowchart illustrations of methods.

Figure 3:
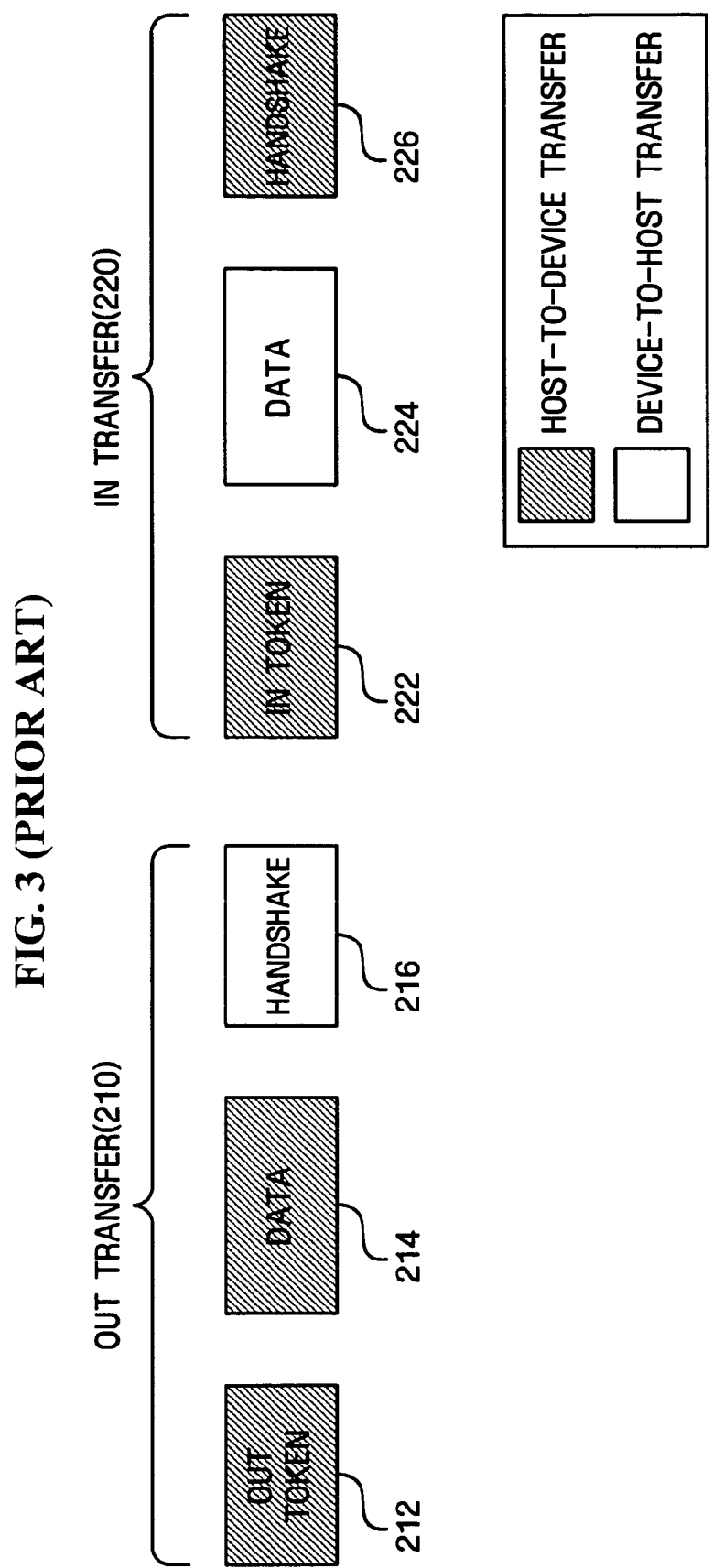
FIG. 3 illustrates data transmission according to wired USB.

FIG. 3 illustrates data transmission according to a wired Universal Serial Bus (USB).

Figure 4:
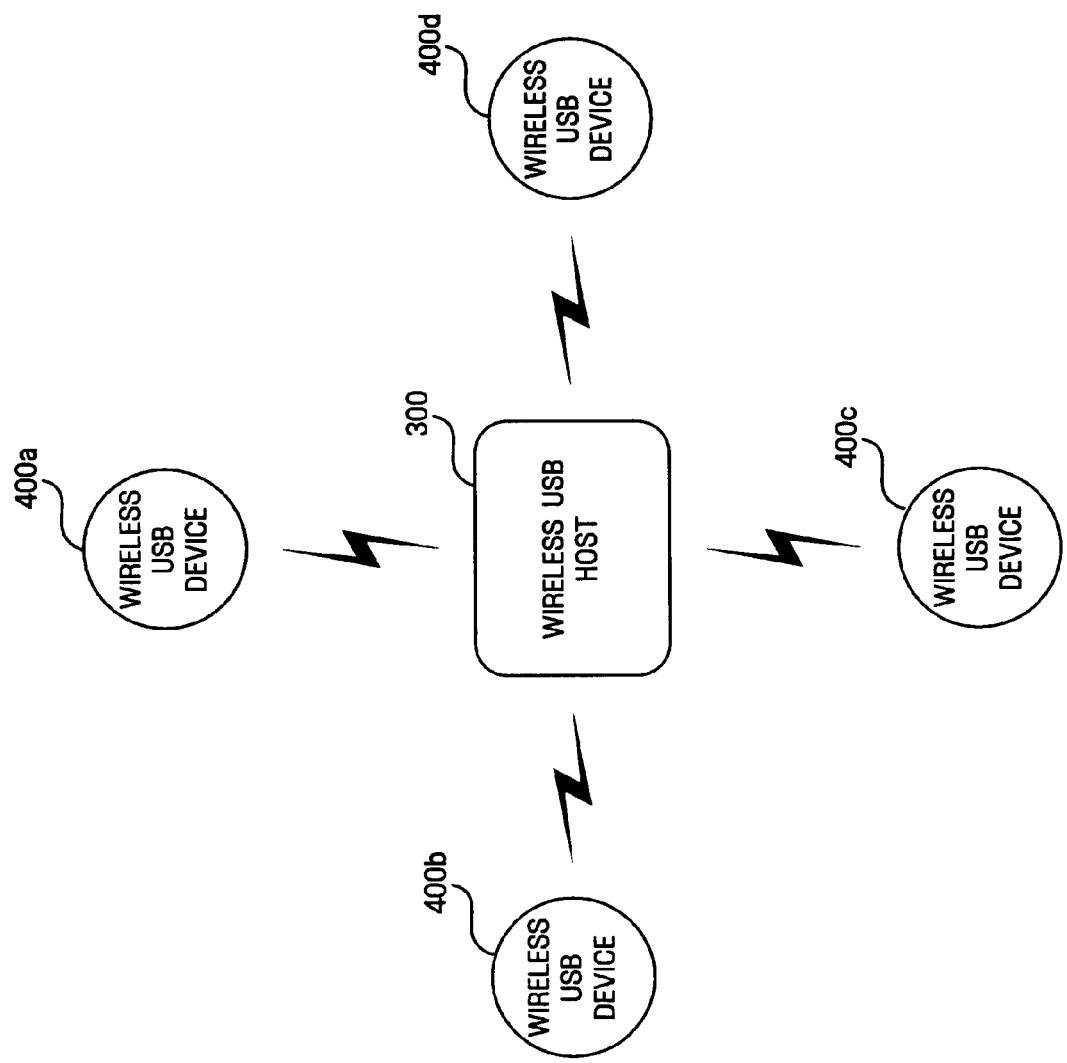
FIG. 4 illustrates a wireless USB system according to an exemplary embodiment of the present invention.
Figure 5:
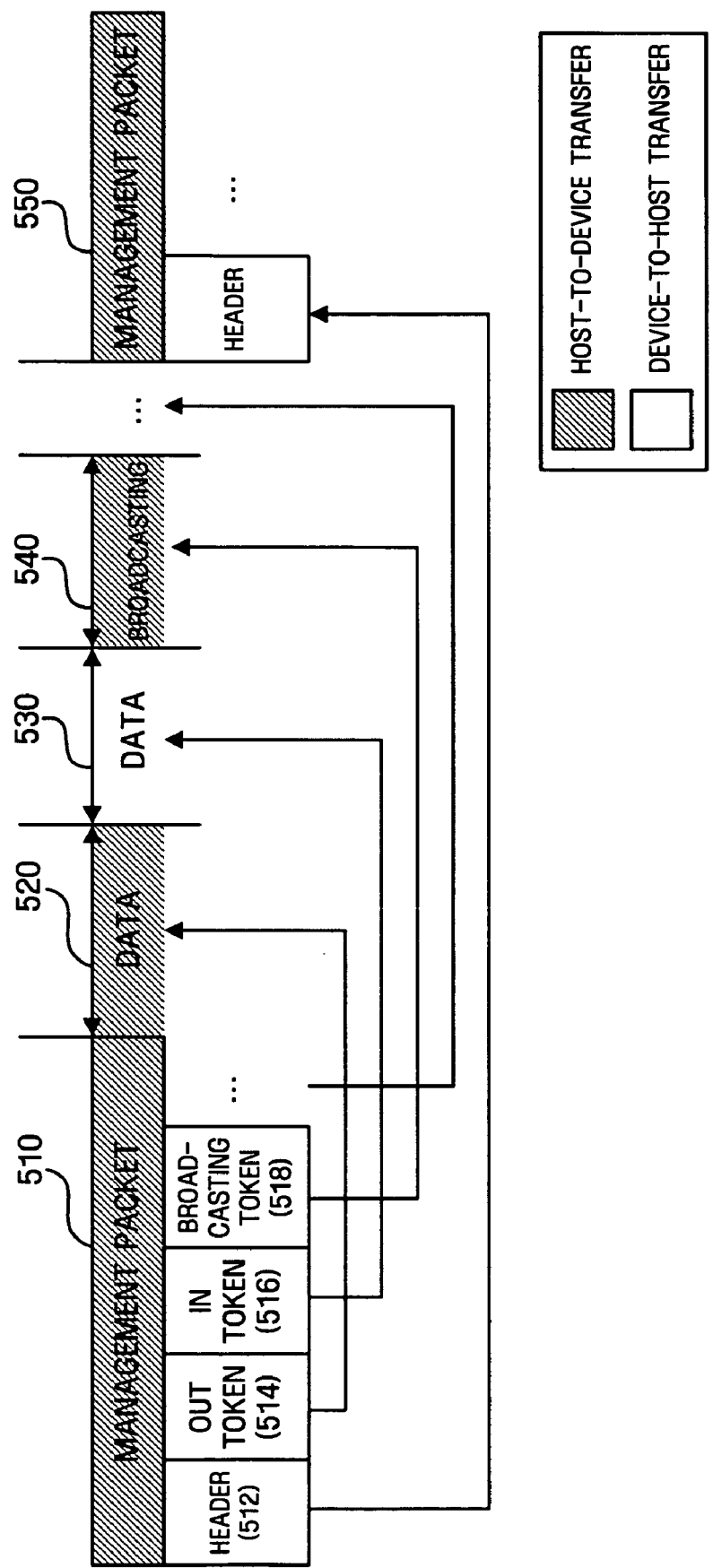
FIG. 5 illustrates data transmission according to a wireless USB system.

Referring to FIGS. 3, 4 and 5, a comparison between transmission of data packets according to typical wired USB, which will hereinafter be abbreviated to USB, and transmission of data packets according to wireless USB according to the present invention will now be described.

USB transactions are mainly categorized into an OUT transfer 210 of a data packet from a USB host to a USB device and an IN transfer 220 of a data packet from a USB device to a USB host. All communications between a USB host and a USB device are made through polling performed by the USB host. For example, for the OUT transfer 210, a USB host sends an OUT token packet 212 to a USB device with which the USB host wishes to communicate. The OUT token packet 212 contains information about channel time allocation (CTA) and direction of data communication. If the USB device that receives the OUT token packet 212 is ready to receive a data packet from the USB host, the USB host sends a data packet 214 to the USB device. Then, the USB device transmits a handshake packet 216 containing information about the result of data transmission to the USB host.

On the other hand, for the IN transfer 220, a USB host sends an IN token packet 222 to a target USB device. The IN token packet 222 contains information about CTA and direction of data communication. After the USB device that receives the IN token packet 222 is ready to send a data packet 224, it sends the data packet 224 to the USB host. Subsequently, the USB host transmits a handshake packet 226 containing information about the result of data transmission to the USB device.

There are delays between the data packet 214 and the handshake packet 216 and between the handshake packet 216 and the IN token packet 222, and between the IN token packet 222 and the data packet 224 where the direction of communication is changed.

FIG. 4 illustrates a wireless USB system according to an exemplary embodiment of the present invention.

Referring to FIG. 4, a wireless USB system includes a wireless USB host 300 and one or more wireless USB devices, e.g., wireless USB devices 400a through 400d. The USB host 300 connects to the wireless USB devices 400a through 400d, forming a cluster. The wireless USB host sets appropriate channel times and communication directions for the wireless USB devices 400a through 400d by broadcasting a management packet containing one or more tokens indicating CTA information. Communication between the wireless USB host 300 and the wireless USB devices 400a through 400d is made using a Time Division Multiple Access (TDMA) scheme. Data transmission in the wireless USB system will now be described in detail with reference to FIG. 5.

FIG. 5 illustrates data transmission according to a wireless USB system.

The wireless USB host 300 informs the wireless USB devices 400a through 400d of a channel time 520 or 540 that the wireless USB devices 400a through 400d must wait before transmission of a data packet or a channel time 530 allocated to them to transmit a data packet, by broadcasting a management packet 510 containing a plurality of tokens 514, 516 and 518. The management packet 510 shown in FIG. 5 includes a header 512 containing information about the time during which a next management packet 550 is transmitted, an OUT token 514 containing information about the time during which the wireless USB host 300 transmits a data packet to each of the wireless USB devices 400a through 400d and the address of the wireless USB device that will receive the data packet, and an IN token 516 containing information about the time during which each of the wireless USB devices 400a through 400d transmits a data packet to the wireless USB host 300 and the address of a wireless USB device that will transmit the data packet.

The management packet 510 may further include at least one broadcasting token 518 containing information about the time during which the wireless USB host 300 broadcasts a data packet. Each of the wireless USB devices 400a through 400d that has received the management packet 510 is able to know channel time 530 allocated to transmit a data packet to the wireless USB host 300, channel time 520 allocated to receive a data packet from the wireless USB host 300, and time during which the next management packet 550 is transmitted. The wireless USB devices 400a through 400d that have received the broadcasting token 518 are also able to know the channel time 540 during which the wireless USB host 300 broadcasts a data packet. Thus, each of the wireless USB devices 400a through 400d are allowed to transmit and receive a data packet during an appropriate channel time indicated through the management packet 510. The management packet 510 may further include information indicating the time during which a handshake packet is transmitted.

Hereinafter, terms and definitions used in "Wireless Universal Serial Bus specification, 2005-5-12, revision 1.0" jointly developed by Samsung Electronics Co., Ltd. IBM, Microsoft, Intel, Philips Electronics, Agere Systems, NEC, and Hewlett-Packard on May 2005 (hereinafter referred to as "wireless USB standard 1.0") will be used to describe the present invention. Thus, unless otherwise specified, the details related to the present invention will be understood by referring to the wireless USB 1.0 standard available through the website "www.usb.org". The present invention is not limited by the details of the wireless USB 1.0 standard and can be applied through other wireless USB standards.

Figure 6:
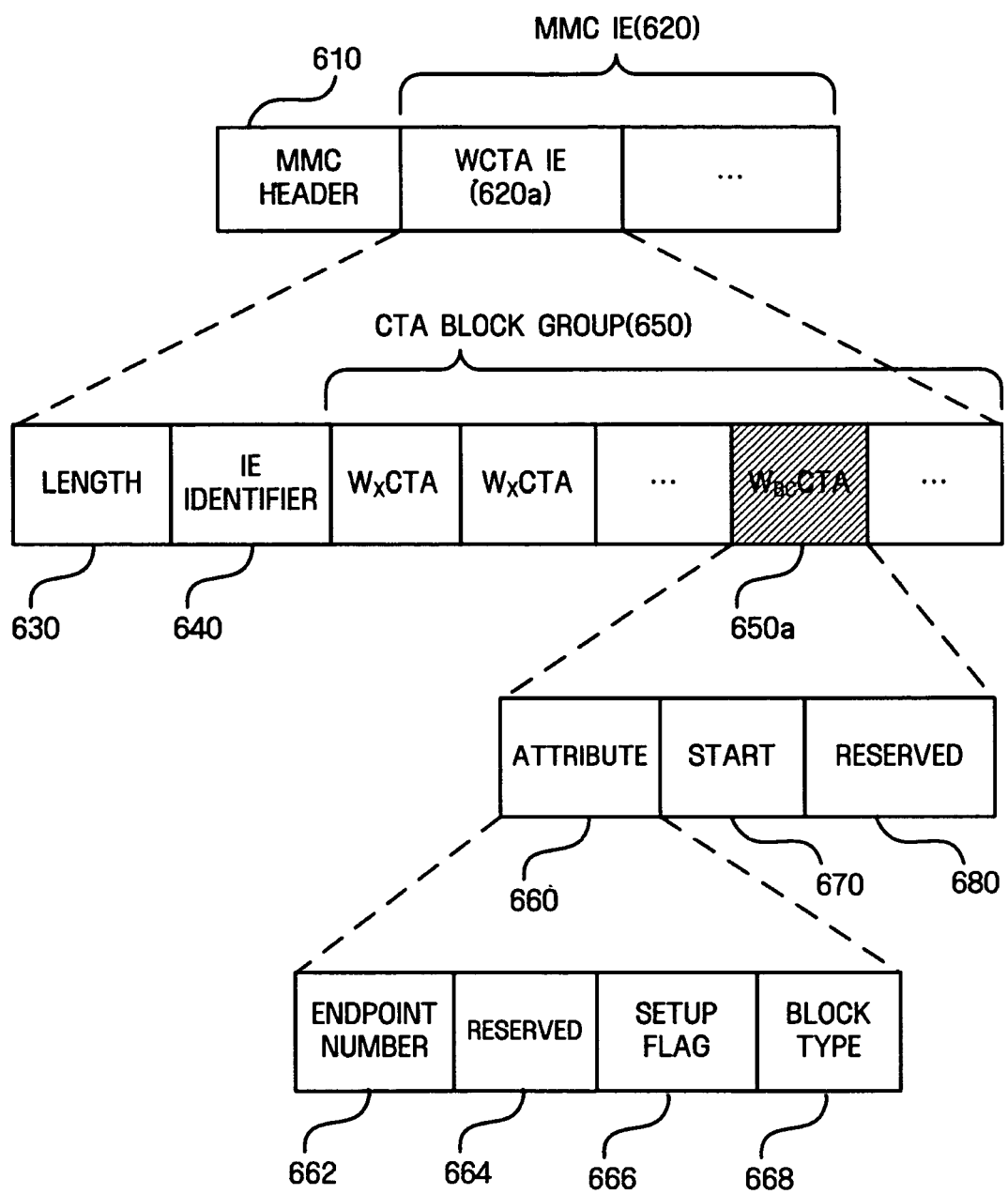
FIG. 6 illustrates the format of a management packet according to an exemplary embodiment of the present invention.

FIG. 6 illustrates the format of a management packet according to an exemplary embodiment of the present invention.

FIG. 6 illustrates an example of a management packet implemented as a Micro-scheduled Management Command (MMC) packet defined in the wireless USB 1.0 standard. The MMC packet may be encapsulated into a MAC frame (not shown). The MMC packet includes an MMC header 610 containing information about the time during which a next MMC packet is transmitted and an MMC Information Element (IE) 620 containing at least one IE. The MMC IE 620 includes a wireless USB CTA (WCTA) IE field 620a indicating CTA information for wireless USB devices. The CTA information can be understood as corresponding to the plurality of tokens 514 through 518 contained in the management packet 510 shown in FIG. 5.

More specifically, the WCTA IE field 620a contains a length field 630, an IE identifier field 640, and a CTA block group 650.

The length field 630 indicates the size of the WCTA IE field 620a and the IE identifier field 640 contains information identifying the WCTA IE field 620a.

The CTA block group 650 includes one or more $W_X$CTA blocks containing information about channel time that can be used for wireless USB devices to transmit or receive data packets. The wireless USB 1.0 standard defines three kinds of CTA blocks, namely, a Wireless USB Device Receive CTA ($W_{DR}$CTA) block, a Wireless USB Device Transmit CTA ($W_{DT}$CTA) block, and a Wireless USB Device Notification Time Slot CTA ($W_{DNTS}$CTA) block.

The $W_{DR}$CTA block indicates the address of a wireless USB device that will receive a data packet from a wireless USB host and channel time during which the wireless USB device receives the data packet.

The $W_{DT}$CTA block specifies the address of a wireless USB device that will transmit a data packet to the wireless USB host and channel time during which the wireless USB device transmits the data packet.

The $W_{DNTS}$CTA block indicates channel time allocated to wireless USB devices to transmit a small, asynchronous notification message to the wireless USB host.

The present exemplary embodiment newly proposes a Wireless USB Broadcast CTA ($W_{BC}$CTA) block 650a indicating channel time during which a wireless USB host broadcasts a data packet to wireless USB devices. The $W_{BC}$CTA block 650a contains a start field 670, an attribute field 660, and a reserved field 680. The start field 670 contains information about time during which a wireless USB host broadcasts a data packet and the time is represented in microseconds.

The attribute field 660 contains an endpoint number field 662 indicating an endpoint of each wireless USB device that is the destination of a data packet being broadcasted, a reserved field 664, a setup flag field 666, and a block type code field 668. The block type code field 668 contains identifier information indicating that the current CTA block 650a is a $W_{BC}$CTA block.

In the wireless USB 1.0 standard, each CTA block contains a 2-bit block type code field. The $W_{DR}$CTA block, the $W_{DT}$CTA block, and the $W_{DNTS}$CTA block contain block type code fields that are set to '00', '01', and '10', respectively, and a block type code value '11' is reserved. In the present exemplary embodiment, a reserved block type code value '11' is used to indicate the $W_{BC}$CTA block. Thus, when a wireless USB device that receives the MMC packet analyzes the MMC packet to check that the current CTA block contains a block type code field that is set to '11', the wireless USB device can recognize that a wireless USB host broadcasts a data packet during a channel time indicated by the CTA block.

According to the exemplary embodiment illustrated in FIG. 6, broadcast CTA information can be set through a CTA block using the reserved block type code value. Alternatively, the broadcast CTA information may be defined by setting a device identifier (ID) field in the $W_{DR}$CTA block used in the wireless USB 1.0 standard to a broadcast address, which will now be described in detail with reference to FIG. 7.

Figure 7:
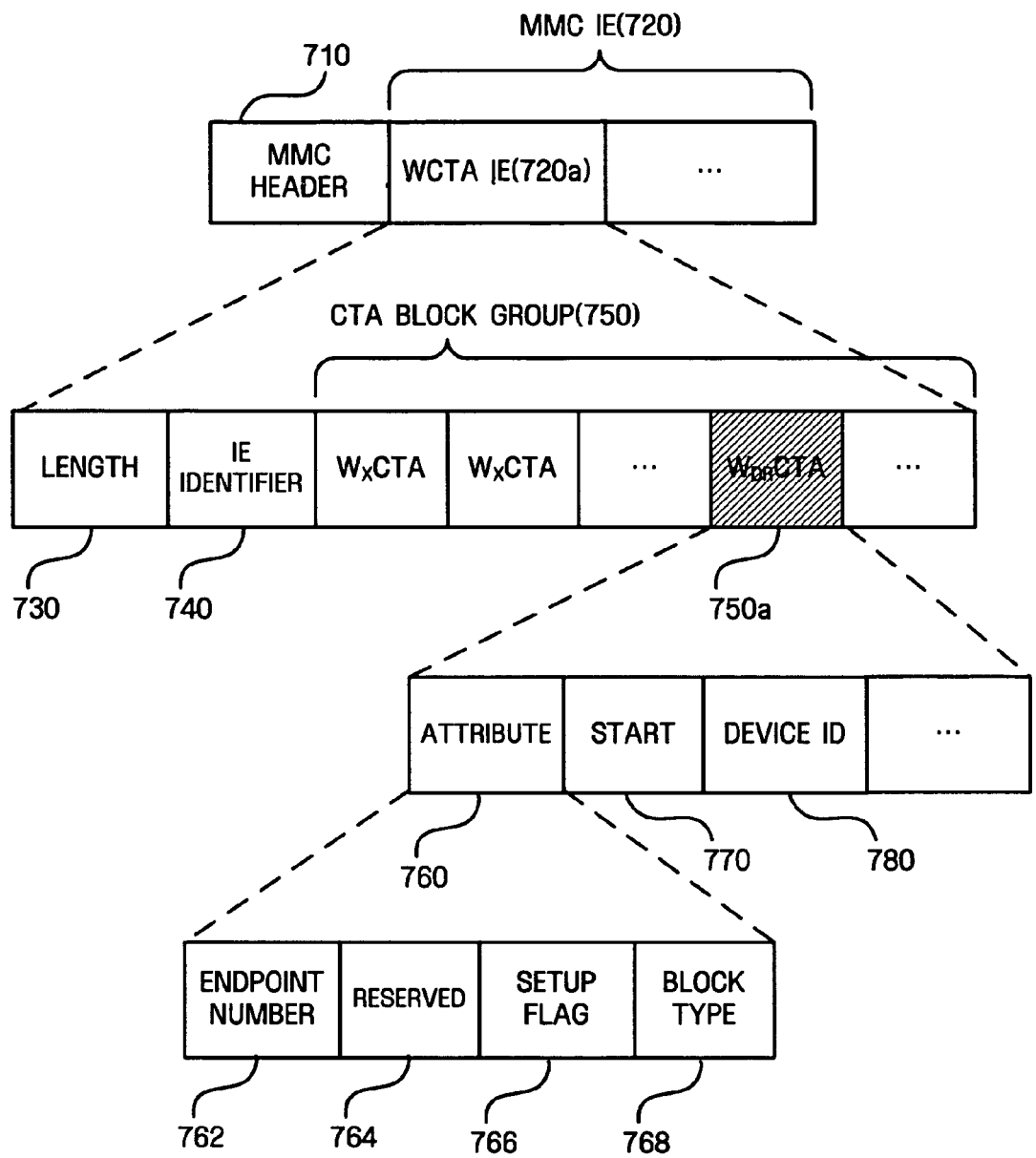
FIG. 7 illustrates the format of a management packet according to another exemplary embodiment of the present invention.

FIG. 7 illustrates the format of a management packet according to another exemplary embodiment of the present invention.

Referring to FIG. 7, a management packet implemented as an MMC packet defined in the wireless USB 1.0 standard is illustrated. The MMC packet may be encapsulated into a MAC frame (not shown). The MMC packet includes an MMC header 710 containing information about the time during which a next MMC packet is transmitted and an MMC IE 720 containing at least one IE.

CTA information can be understood as corresponding to the plurality of tokens 514 through 518 contained in the management packet 510 shown in FIG. 5.

More specifically, a WCTA IE field 720a contains a length field 730, an IE identifier field 740, and a CTA block group 750. The length field 730 indicates the size of the WCTA IE field 720a and the IE identifier field 740 contains information identifying the WCTA IE field 720a.

The CTA block group 750 includes one or more $W_X$CTA blocks containing information about channel time that can be used for wireless USB devices to transmit or receive data packets. As described above with reference to FIG. 6, the wireless USB 1.0 standard defines three kinds of CTA blocks, namely, a $W_{DR}$CTA block, a $W_{DT}$CTA block, and a $W_{DNTS}$CTA block.

In the present exemplary embodiment, a $W_{DR}$CTA block 750a is used to define broadcast CTA information. The $W_{DR}$CTA block 750a contains an attribute field 760, a start field 770, and a device ID field 780.

The attribute field 760 contains an endpoint number field 762 indicating an endpoint that is the destination of a data packet being broadcasted, a reserved field 764, a setup flag field 766, and a block type code field 768. The block type code field 768 may be set to '00', indicating a $W_{DR}$CTA block.

The start field 770 contains information about time during which a wireless USB host broadcasts a data packet and the time can be represented in microseconds.

In the current exemplary embodiment, a device ID field 780 is used to indicate the $W_{DR}$CTA block 750a. When a wireless USB host uses the $W_{DR}$CTA block 750a to transmit a data packet to a specific wireless USB device, a device address of the wireless USB device that will receive the data packet from the wireless USB host at the time indicated by the start field 770 is set to the device ID field 780.

On the other hand, when the wireless USB host uses the $W_{DR}$CTA block 750a to transmit a data packet to a specific wireless USB device, a device address of the wireless USB device that will receive the data packet from the wireless USB host at the time indicated by the start field 770 is set to the device ID field 780. For example, the wireless USB host uses device ID '0' as a broadcast address while assigning device IDs to wireless USB devices, starting with '1'. Thus, when a wireless USB device that has received the MMC packet analyzes the MMC packet to check that a device ID field of the $W_{DR}$CTA block having a block type code field set to '00' is set to a broadcast address, the wireless USB device can recognize that the wireless USB host broadcasts a data packet during channel time indicated by the $W_{DR}$CTA block.

Figure 8:
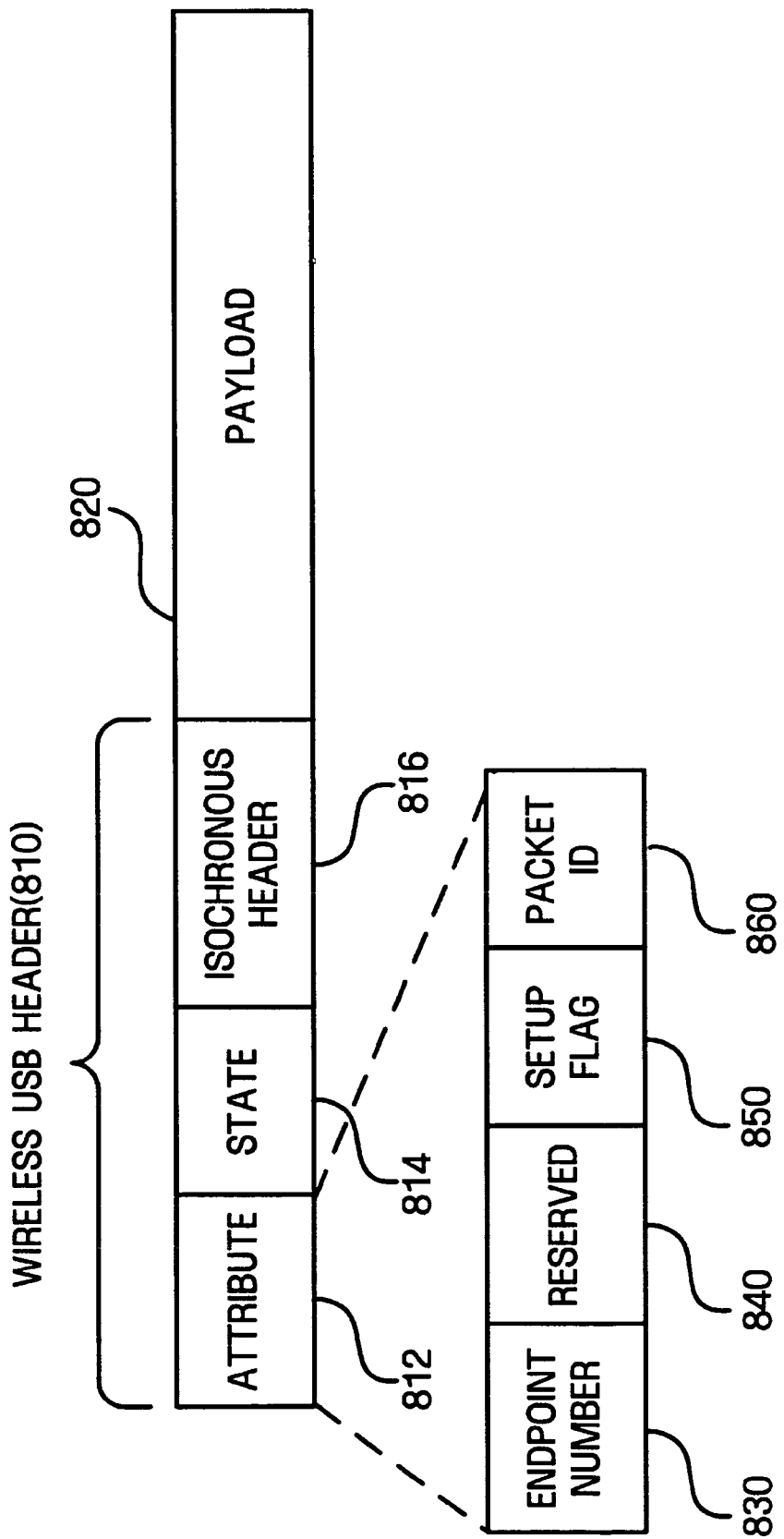
FIG. 8 schematically illustrates the format of a data packet used in a wireless USB system according to an exemplary embodiment of the present invention.

A data packet being broadcasted during channel time that is allocated for a wireless USB host to broadcast a data packet using the management packet described with reference to FIG. 6 or 7 can contain identifier information identifying itself as data being broadcasted. FIG. 8 illustrates the format of a data packet used in wireless USB according to an exemplary embodiment of the present invention.

FIG. 8 schematically illustrates the format of a data packet used in a wireless USB system according to an exemplary embodiment of the present invention.

Referring to FIG. 8, a data packet includes a wireless USB header 810 and a payload 820 carrying data. The wireless USB header 810 contains an attribute field 812, a state field 814, and an isochronous field 816. The state field 814 includes a sequence number and a handshake code of the data packet. The isochronous field 816 is used to specify the format of isochronous data when the data contained in the payload 820 is isochronous data.

The attribute field 812 contains an endpoint number field 830 indicating an endpoint that is the destination of data carried by the payload 820, a reserved field 840, a setup flag field 850, and a packet ID field 860. The packet ID field 860 is set to an identifier identifying the type of the data packet. Table 1 shows identifier values in the packet ID field 860.

TABLE 1

| Packet ID type | Value | Description |
| --- | --- | --- |
| Data | 000B | Data packet |
| Isochronous data | 001B | Isochronous data packet |
| Handshake | 100B | Handshake packet |
| Notify | 101B | Device notification |
| Broadcast | 010B | Data packet being broadcasted |
| Reserved | 011B, 110B-111B | Reserved for future use |

In the present exemplary embodiment, one of the values used to represent a packet ID in the wireless USB 1.0 standard (e. g., 010B in Table 1) can be used to indicate a data packet being broadcasted.

In the data packet being broadcasted, the end point number field 830, the reserved field 840, and the setup flag field 850 in the attribute field 812 can all be set to null values.

Figure 9:
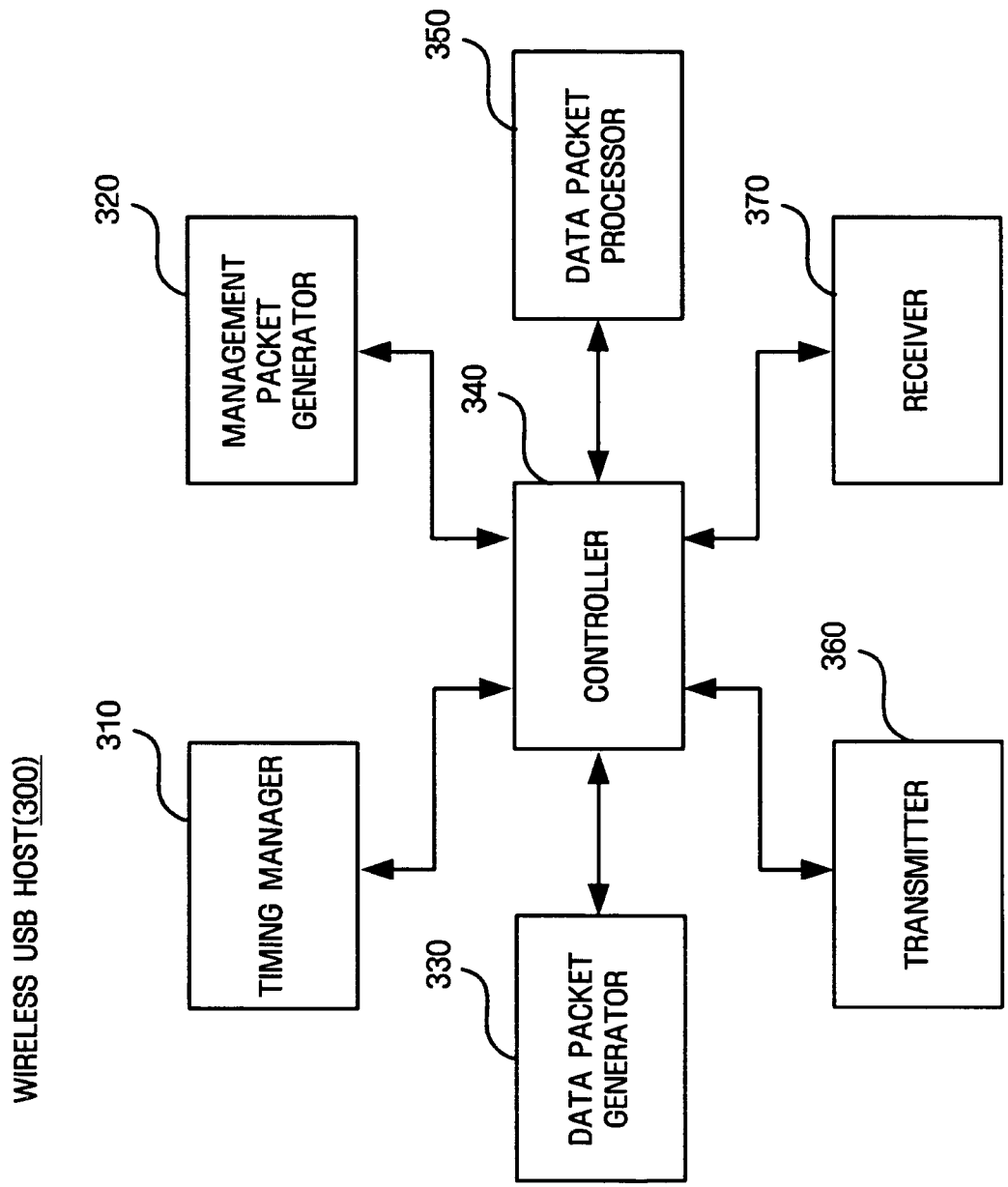
FIG. 9 is a block diagram of a wireless USB host according to an exemplary embodiment of the present invention.

FIG. 9 is a block diagram of a wireless USB host 300 according to an exemplary embodiment of the present invention.

Referring to FIG. 9, the wireless USB host 300 includes a timing manager 310, a management packet generator 320, a data packet generator 330, a controller 340, a data packet processor 350, a transmitter 360, and a receiver 370. The timing manager 310 manages channel time that will be used for transmission and reception of data between one or more wireless USB devices and the wireless USB host 300 based on TDMA. For example, the timing manager 310 may allocate channel time to a specific wireless USB device to receive or transmit a data packet from or to the wireless USB host 300. The timing manager 310 may also assign channel time to all wireless USB devices to receive a data packet being broadcasted from the wireless USB host 300.

The management packet generator 320 generates a management packet containing CTA information when channel time is allocated by the timing manager 310. The management packet may be an MMC packet defined in the wireless USB 1.0 standard. For example, if broadcast channel time is allocated by the timing manager 310, the management packet generator 320 can generate a MMC packet that defines broadcast CTA information through a CTA block using a reserved block type code value as described with reference to FIG. 6. Alternatively, the management packet generator 320 may generate a MMC packet that defines a $W_{DR}$CTA block containing a device ID field set to a broadcast address as described with reference to FIG. 7.

The data packet generator 330 generates a data packet that will be transmitted to a wireless USB device. The data packet generated by the data packet generator 330 has the same format as described with reference to FIG. 8.

The transmitter 360 sends a management packet generated by the management packet generator 320 to wireless USB devices. The management packet may be broadcasted. The transmitter 360 also sends a data packet to a wireless USB device during channel time that is allocated for the wireless USB host 300 to transmit a data packet through a management packet sent to the wireless USB devices.

The receiver 370 receives a data packet from a wireless USB device. While in the above description, the transmitter 360 and the receiver 370 are separate components, they may be implemented as an integrated functional block.

The data packet processor 350 processes the data packet that the receiver 370 has received from the wireless USB device. For example, the data packet processor 350 may interpret the received data packet and then deliver data contained in the data packet to an appropriate endpoint.

The controller 340 controls the operations of the timing manager 310, the management packet generator 320, the data packet generator 330, the data packet processor 350, the transmitter 360 and the receiver 370. The controller 340 can also perform authentication and connection with a new wireless USB device.

Figure 10:
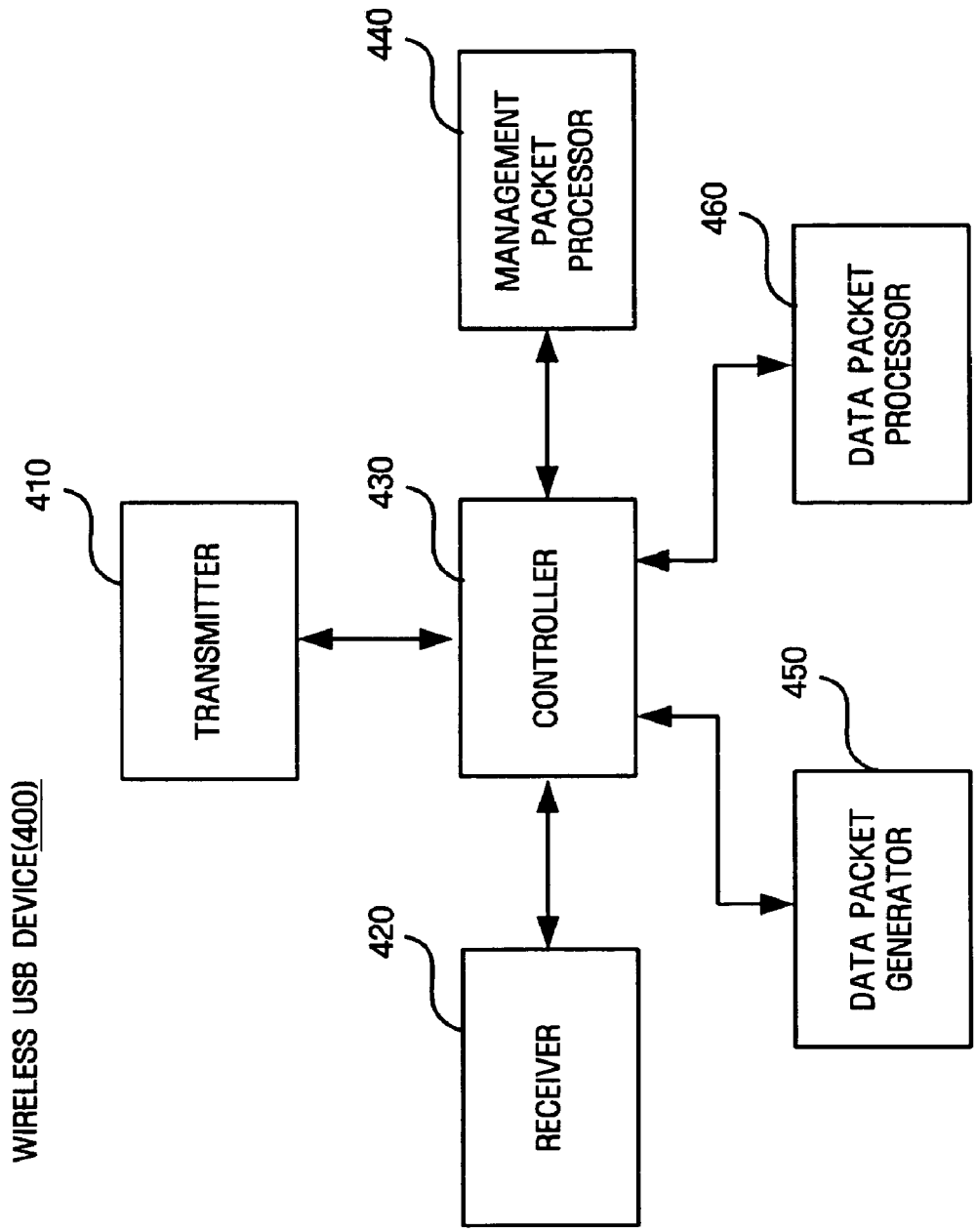
FIG. 10 is a block diagram of a wireless USB device according to an exemplary embodiment of the present invention.

FIG. 10 is a block diagram of a wireless USB device 400 according to an exemplary embodiment of the present invention.

The wireless USB device 400 is representative of the four wireless USB devices 400a through 400d shown in FIG. 4. Specifically, the wireless USB device 400 includes a transmitter 410, a receiver 420, a controller 430, a management packet processor 440, a data packet generator 450, and a data packet processor 460.

The management packet processor 440 extracts CTA information from a management packet that the receiver 420 has received from the wireless USB host (300 of FIG. 9) and uses the CTA information to manage channel time. More specifically, the management packet processor 440 interprets the management packet to manage channel time that will be used for transmission and reception of a data packet. In particular, the management packet processor 440 extracts broadcast CTA information from the received management packet. In this case, when the management packet shown in FIG. 6 is used within a wireless USB cluster as shown in FIG. 4, the management packet processor 440 extracts broadcast CTA information through a CTA block in the management packet using a reserved block type code. When the management packet shown in FIG. 7 is used, the management packet processor 440 may extract broadcast CTA information through a W$_{DR}$CTA block containing a device ID field set to a broadcast address.

The data packet processor 460 delivers a data packet received during time indicated by broadcast CTA information extracted by the management packet processor 440 to an endpoint responsible for reception of data being broadcasted. The transmitter 410 sends a data packet generated by the data packet generator 450 to the wireless USB host 300 during the channel time managed by the management packet processor 440.

The elements of FIGS. 9 through 10 may be embodied by a kind of module. The module indicates a software component or a hardware component such as a field-programmable gate array (FPGA) or an application-specific integrated circuit (ASIC). The module performs a particular function but is not restricted to software and hardware. The module may be included in an addressable storage medium or may be configured to executed by one or more processors. Accordingly, module may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by module may be combined into a smaller number of components and a smaller number of modules, or may be divided into a greater number of components and a greater number of modules.

Operation processes for the wireless USB host 300 and the wireless USB device 400 will now be described in more detail with reference to FIGS. 11 and 12.

Figure 11:
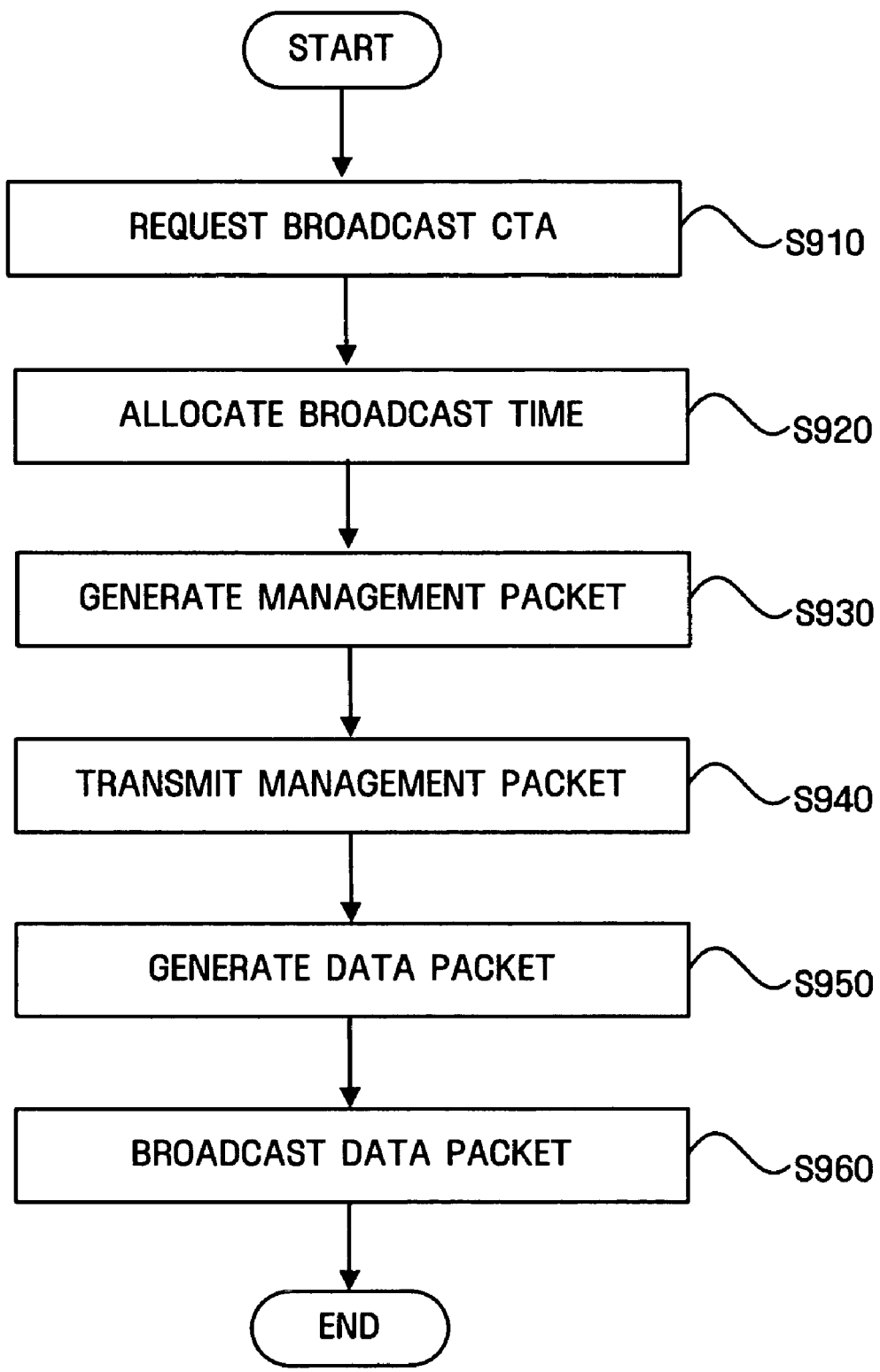
FIG. 11 is a flowchart illustrating a method of broadcasting a data packet in a wireless USB environment according to an exemplary embodiment of the present invention.

FIG. 11 is a flowchart illustrating a method of broadcasting a data packet in a wireless USB environment according to an exemplary embodiment of the present invention.

Referring to FIG. 11, in operation S910, when the wireless USB host 300 has data to broadcast to the wireless USB devices 400a through 400d, the controller 340 requests broadcast CTA from the timing manager 310.

In operation S920, the timing manager 310 allocates broadcast channel time according to the request of the controller 340. In operation S930, the management packet generator 320 generates a management packet containing broadcast CTA information. As described above, the management packet may be an MMC packet used in the wireless USB 1.0 standard.

More specifically, the management packet generated in the operation S930 may be a management packet in which broadcast CTA information is set through a CTA block using a reserved block type code value, as described with reference to FIG. 6. Alternatively, as described above with reference to FIG. 7, the management packet may be a packet in which broadcast CTA information is set through a W$_{DR}$CTA block containing a device ID field set to a broadcast address.

In operation S940, the transmitter 360 sends the management packet to the wireless USB devices 400a through 400d within the same cluster. The management packet may be broadcasted.

In operation S950, the data packet generator 330 generates a data packet to be broadcasted. In operation S960, the transmitter 360 broadcasts a data packet during time indicated by broadcast CTA information contained in the management packet sent in the operation S940.

Figure 12:
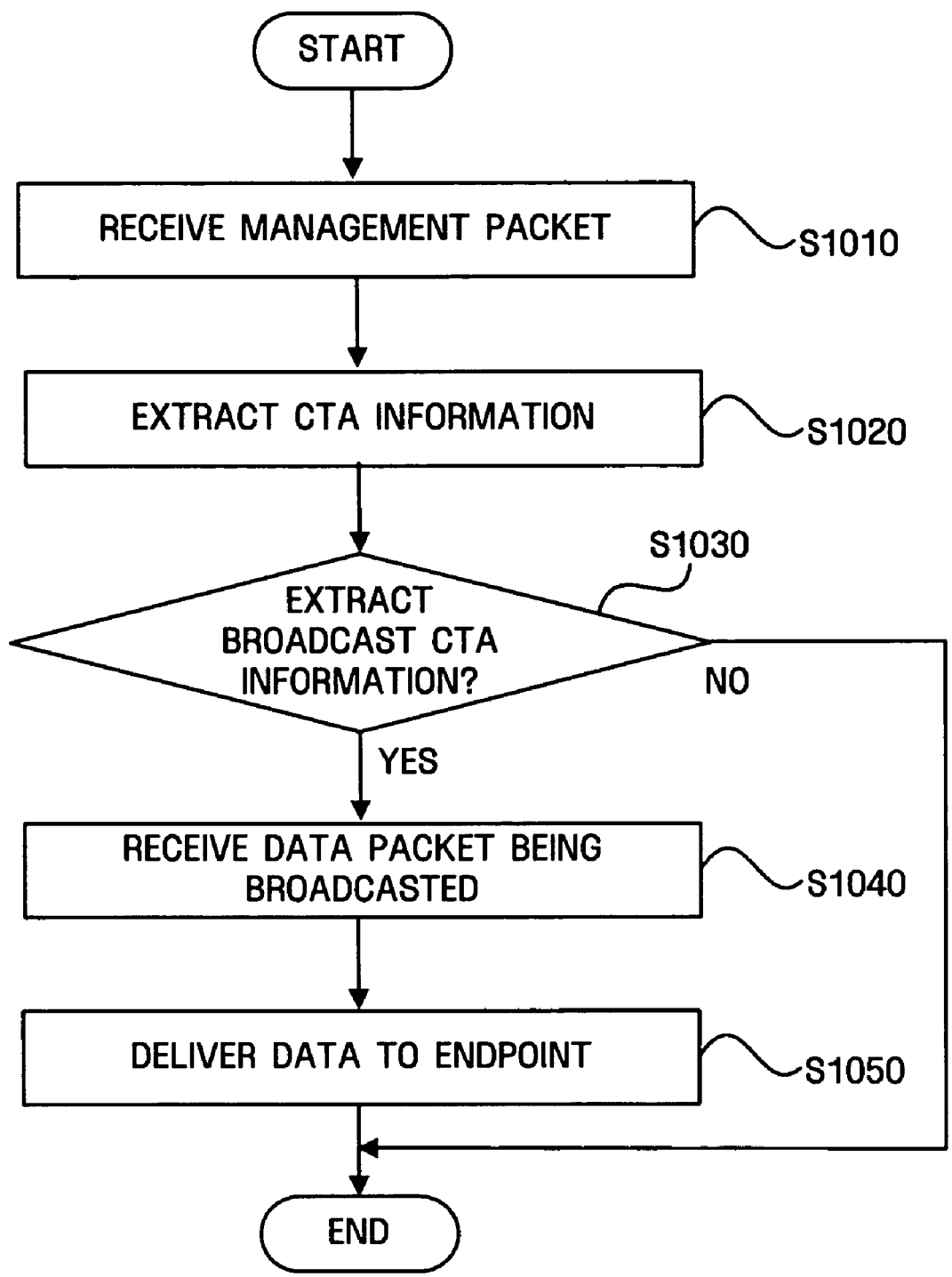
FIG. 12 is a flowchart illustrating a method of receiving a data packet being broadcasted in a wireless USB environment according to an exemplary embodiment of the present invention.

FIG. 12 is a flowchart illustrating a method of receiving a data packet being broadcasted in a wireless USB environment according to an exemplary embodiment of the present invention.

Referring to FIG. 12, when the receiver 420 receives a management packet from the wireless USB host in operation S1010, the management packet processor 440 extracts CTA information from the management packet in operation S1020. When the management packet contains broadcast CTA information as described with reference to FIG. 6, the management packet processor 440 can extract broadcast CTA information through a CTA block in the management packet using a reserved block type code. Alternatively, when the management packet contains broadcast CTA information as described with reference to FIG. 7, the management packet processor 440 may extract broadcast CTA information through a W$_{DR}$CTA block containing a device ID field set to a broadcast address.

When the management packet processor 440 extracts the broadcast CTA information from the management packet in operation S1030, the receiver 420 receives a data packet being broadcasted by the wireless USB host 300 during the time indicated by the broadcast CTA information in operation S1040.

In operation S1050, the data packet processor 460 delivers data contained in the received data packet to an endpoint responsible for reception of the data being broadcasted.

As described above, the method for broadcasting data packet and receiving the data packet in a wireless universal serial bus (USB) environment, a wireless USB host, and a wireless USB device according to the exemplary embodiments of the present invention may provide the following advantages.

First, exemplary embodiments of the present invention allows data packets to be broadcasted and receive the data packet being broadcasted in a wireless USB environment.

Second, exemplary embodiments of the present invention can achieve efficient use of a wireless channel.

Third, exemplary embodiments of the present invention can achieve low power consumption of a wireless USB host.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method for broadcasting a data packet in a wireless Universal Serial Bus (USB) environment, the method comprising:

generating a management packet containing broadcast Channel Time Allocation (CTA) information;

transmitting the management packet to at least one USB device within a cluster of USB devices; and broadcasting a data packet during a time indicated by the broadcast CTA information.

2. The method of claim 1, wherein the management packet is a Micro-scheduled Management Command packet according to a wireless USB standard.

3. The method of claim 2, wherein the broadcast CTA information is set through a CTA block using a reserved block type code value.

4. The method of claim 2, wherein the broadcast CTA information is set through a Device Receive CTA block containing a device identifier field set to a broadcast address.

5. A method for receiving a data packet being broadcasted in a wireless Universal Serial Bus (USB) environment, the method comprising:
- receiving a management packet from a wireless USB host;
- extracting broadcast CTA information from the received management packet; and
- receiving a data packet broadcasted by the wireless USB host during a time indicated by the extracted broadcast CTA information.

6. The method of claim 5, wherein the management packet is a Micro-scheduled Management Command packet according to a wireless USB standard.

7. The method of claim 6, wherein the broadcast CTA information is set through a CTA block using a reserved block type code value.

8. The method of claim 6, wherein the broadcast CTA information is set through a Device Receive CTA block containing a device identifier field set to a broadcast address.

9. The method of claim 5, further comprising delivering data contained in the received data packet to an endpoint responsible for reception of the data being broadcasted.

10. A wireless Universal Serial Bus (USB) host comprising:
- a management packet generator which generates a management packet containing broadcast Channel Time Allocation (CTA) information;
- a data packet generator which generates a data packet to be broadcasted;
- a transmitter which sends the management packet to at least one wireless USB device within a cluster of USB devices and broadcasts the data packet during a broadcast channel time indicated by the broadcast CTA information.

11. The wireless USB host of claim 10, wherein the management packet is a Micro-scheduled Management Command packet according to a wireless USB standard.

12. The wireless USB host of claim 11, wherein the broadcast CTA information is set through a CTA block using a reserved block type code value.

13. The wireless USB host of claim 11, wherein the broadcast CTA information is set through a Device Receive CTA block containing a device identifier field set to a broadcast address.

14. The wireless USB host of claim 10, further comprising a timing manager which allocates the broadcast channel time, wherein the broadcast CTA information comprises the broadcast channel time allocated by the timing manager.

15. The wireless USB host of claim 14, wherein the timing manager allocates the broadcast channel time to a specific wireless USB device to receive the data packet from the wireless USB host, or allocates the channel time to all of the USB devices to receive the data packet being broadcasted from the wireless USB host.

16. A wireless Universal Serial Bus (USB) device comprising:
- a receiver which receives a management packet and a data packet from a wireless USB host;
- a management packet processor which extracts broadcast Channel Time Allocation (CTA) information from the received management packet; and
- a data packet processor which delivers data contained in the data packet received during a time indicated by the extracted broadcast CTA to an endpoint responsible for reception of the data being broadcasted.

17. The wireless USB device of claim 16, wherein the management packet is a Micro-scheduled Management Command packet according to a wireless USB standard.

18. The wireless USB device of claim 17, wherein the broadcast CTA information is set through a CTA block using a reserved block type code value.

19. The wireless USB device of claim 17, wherein the broadcast CTA information is set through a Device Receive CTA block containing a device identifier field set to a broadcast address.

* * * * *